(12) United States Patent
Heinemann

(10) Patent No.: US 11,235,838 B2
(45) Date of Patent: Feb. 1, 2022

(54) BATTERY LOCK FOR AN ELECTRIC VEHICLE

(71) Applicant: ABUS AUGUST BREMICKER SOHNE KG, Wetter-Volmarstein (DE)

(72) Inventor: Stefan Heinemann, Wetter (DE)

(73) Assignee: ABUS AUGUST BREMICKER SOHNE KG, Wetter-Volmarstein (DE)

( * ) Notice: Subject to any disclaimer, the term of this patent is extended or adjusted under 35 U.S.C. 154(b) by 170 days.

(21) Appl. No.: 16/341,680

(22) PCT Filed: Sep. 26, 2017

(86) PCT No.: PCT/EP2017/074312
§ 371 (c)(1),
(2) Date: Apr. 12, 2019

(87) PCT Pub. No.: WO2018/069035
PCT Pub. Date: Apr. 19, 2018

(65) Prior Publication Data
US 2020/0039607 A1    Feb. 6, 2020

(30) Foreign Application Priority Data

Oct. 13, 2016    (DE) ..................... 10 2016 119 570.7

(51) Int. Cl.
| | |
|---|---|
| *B62M 6/90* | (2010.01) |
| *B62H 5/00* | (2006.01) |
| *B62M 6/50* | (2010.01) |
| *B62M 6/55* | (2010.01) |
| *B62J 99/00* | (2020.01) |
| *B62J 45/00* | (2020.01) |

(52) U.S. Cl.
CPC ............... *B62M 6/90* (2013.01); *B62H 5/001* (2013.01); *B62J 99/00* (2013.01); *B62M 6/50* (2013.01); *B62M 6/55* (2013.01); *B62J 45/00* (2020.02)

(58) Field of Classification Search
CPC ............ B62M 6/90; B62M 6/40; B62M 6/55; B62M 6/60; B62M 6/70; B62H 5/001; H01M 50/262; H01M 50/20; H01M 50/264
See application file for complete search history.

(56) References Cited

U.S. PATENT DOCUMENTS

| | | | | |
|---|---|---|---|---|
| 6,016,882 A | * | 1/2000 | Ishikawa ................ | B62K 19/46 180/207.3 |
| 6,095,270 A | * | 8/2000 | Ishikawa .................. | B62H 5/00 180/220 |

(Continued)

FOREIGN PATENT DOCUMENTS

| | | |
|---|---|---|
| CN | 1131622 A | 9/1996 |
| CN | 1293138 A | 5/2001 |

(Continued)

*Primary Examiner* — Minnah L Seoh
*Assistant Examiner* — Michael R Stabley
(74) *Attorney, Agent, or Firm* — Dinsmore & Shohl LLP

(57) ABSTRACT

A vehicle having an electrically operated drive motor, a battery for the energy supply of the drive motor, the battery being secured by a battery lock in a battery compartment of the vehicle and being removable from the battery compartment after unlocking the battery lock, and a control unit for the battery lock.

19 Claims, 1 Drawing Sheet

(56) References Cited

U.S. PATENT DOCUMENTS

| | | | | |
|---|---|---|---|---|
| 8,413,947 | B2* | 4/2013 | Chiang | B62M 6/90 248/553 |
| 8,469,381 | B2* | 6/2013 | Dodman | B62M 6/55 280/281.1 |
| 8,560,147 | B2* | 10/2013 | Taylor | B60L 3/0069 701/2 |
| 8,651,212 | B2* | 2/2014 | Vincenz | B62H 5/001 180/205.1 |
| 8,727,367 | B2* | 5/2014 | Talavasek | B62K 19/30 280/281.1 |
| 8,893,838 | B2* | 11/2014 | Ichikawa | H01M 50/20 180/68.5 |
| 8,979,110 | B2* | 3/2015 | Talavasek | B62M 6/90 280/279 |
| 9,085,342 | B2* | 7/2015 | Jauvtis | B62M 6/60 |
| 9,124,085 | B2* | 9/2015 | Wu | H02H 1/00 |
| 9,260,080 | B2* | 2/2016 | Maguire | B60L 3/0046 |
| 9,260,157 | B2* | 2/2016 | Chu | B62M 6/45 |
| 9,580,141 | B2* | 2/2017 | Talavasek | B62M 6/90 |
| 9,611,003 | B1* | 4/2017 | Yu | B62M 6/90 |
| 9,616,966 | B2* | 4/2017 | Talavasek | B62K 25/28 |
| 9,950,602 | B2* | 4/2018 | Duan | B62M 6/90 |
| 10,183,591 | B2* | 1/2019 | Shieh | B60L 50/64 |
| 10,343,747 | B2* | 7/2019 | Cunado Landa | B62K 19/40 |
| 2007/0007064 | A1 | 1/2007 | Okamoto et al. | |
| 2011/0240391 | A1* | 10/2011 | Bonneville | B62M 6/90 180/220 |
| 2015/0091698 | A1* | 4/2015 | Du | B60R 25/2036 340/5.72 |
| 2016/0288875 | A1* | 10/2016 | Fujiwara | B62H 5/001 |

FOREIGN PATENT DOCUMENTS

| | | |
|---|---|---|
| CN | 202202658 U | 4/2012 |
| CN | 204451980 U | 7/2015 |
| CN | 204701700 U | 10/2015 |
| CN | 105386661 A | 3/2016 |
| DE | 102011083031 A1 | 8/2012 |
| EP | 2423096 A2 | 2/2012 |
| JP | H08175466 A | 7/1996 |
| JP | H 10181651 A | 7/1998 |
| JP | H10308202 A | 11/1998 |
| WO | 2012160407 A1 | 11/2012 |

* cited by examiner

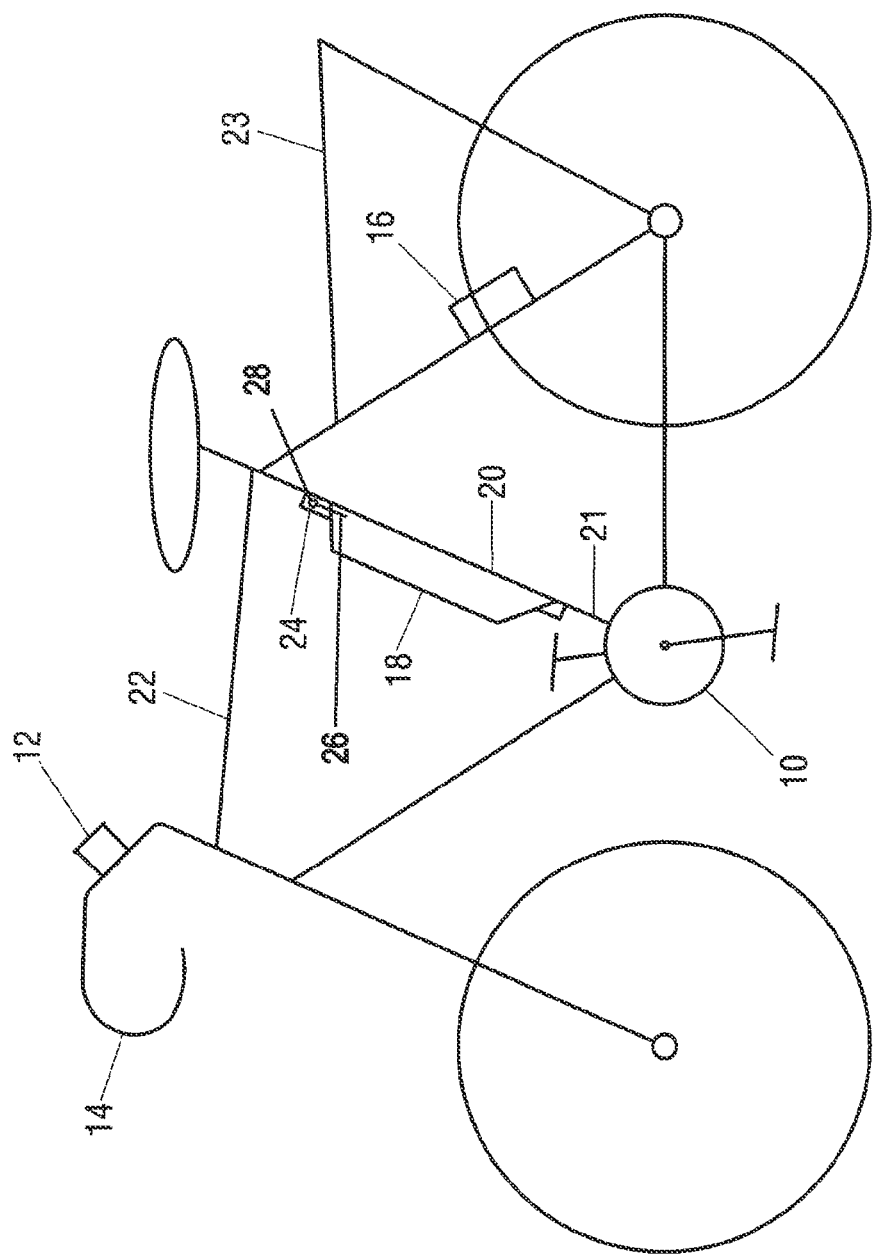

BATTERY LOCK FOR AN ELECTRIC VEHICLE

CROSS-REFERENCE TO RELATED APPLICATIONS

This application is a U.S. National Stage Application of PCT/EP2017/074312 filed Sep. 26, 2017, which claims priority to German Patent Application DE 102016119570.7 filed Oct. 13, 2016, the entire contents of which are incorporated herein by reference.

TECHNICAL FIELD

The present disclosure relates to a vehicle having an electrically operated drive motor, having a battery for the energy supply of the drive motor, the battery being secured by a battery lock in a battery compartment of the vehicle and being removable from the battery compartment after unlocking the battery lock, and having a control unit for the battery lock.

BACKGROUND

Such vehicles are generally known, for example in the form of e-bikes or pedelecs. To secure the battery, these known vehicles typically have a mechanical battery lock that can be unlocked by means of a key.

SUMMARY

It is the underlying object of the present disclosure to provide a vehicle that is characterized by higher operating comfort and by greater economy.

A vehicle having the features of claim 1 is provided to satisfy this object.

It is the general idea underlying the present disclosure to replace the conventional mechanical battery lock with an electrically unlockable battery lock, whereby a physical key for unlocking the battery lock which the user of the vehicle would always have to carry along with him and which he may not have to hand under certain circumstances can be dispensed with. The vehicle can, for example, be an electric bicycle, in particular an e-bike or a pedelec, an electric tricycle, an electric wheelchair, an electric quad bike or the like.

Embodiments of the present disclosure can be seen from the dependent claims, from the description and from the drawing.

In accordance with a particularly embodiment, the battery lock is automatically locked after the insertion of the battery into the battery compartment. As long as the battery is mounted to the vehicle, the normal state of the battery lock is therefore a locked state. The battery is hereby always reliably secured to the vehicle and the user does not have to remember to actively lock the battery lock. An embodiment is, however, generally also conceivable in which the battery compartment is unlocked as a rule and is only locked on a leaving of the vehicle, e.g. when an onboard computer is removed from the vehicle.

In accordance with a further embodiment, the control unit is integrated into a motor control for the drive motor. The unlocking of the battery lock is therefore ultimately controlled by the motor control. The motor control anyway present for the control of the drive motor in other words takes over an additional function and an additional separate control unit for unlocking the battery lock does not have to be provided.

The control unit is implemented in an onboard computer that is attached to the vehicle in a manner removable by a user. Since the user typically takes the onboard computer with him on a leaving of the vehicle, it is ensured that unauthorized persons can at least not unlock the battery lock and remove the battery without becoming criminally active.

In accordance with an embodiment, the onboard computer comprises an input actuable by a user for unlocking the battery lock. This input can, for example, be a press switch or a sliding switch. Alternatively, the onboard computer can have a touch screen or a microphone via which a corresponding unlocking command can be input.

Instead of being integrated into the motor control, the control unit can also be integrated into the battery lock. In this case, the battery lock is therefore provided with its own control unit that is in particular independent of the motor control and is correspondingly autonomous. Nevertheless the control unit integrated into the battery lock is connected to an onboard computer of the vehicle since the control unit can in this manner communicate with the onboard computer, for example to transmit a release signal permitting the unlocking of the battery lock or to receive a signal indicating the movement state of the vehicle therefrom or to transmit a signal indicating the lock state of the battery lock to the onboard computer.

In particular when the control unit is integrated into the battery lock, the battery lock has an operating element that is actuable by a user, in particular manually, to unlock the battery lock. In this case, the unlocking of the battery lock therefore does not take place via an input to the onboard computer, but instead by actuating the operating element at the battery lock. The operating element can, for example, be a press switch or a sliding switch or also a capacitive sensor that can e.g. detect the presence of a finger of the user. In general, the battery lock can, however, also have such a manually actuable operating element when the control unit is implemented in the onboard computer.

In both cases, high protection against theft is achieved when the control unit only permits an unlocking of the battery lock by the operating element as long as the onboard computer is attached to the vehicle. The unlocking of the battery lock by the operating element thus also requires here that the onboard computer is located at the vehicle. In other words, an unlocking, in particular an unauthorized unlocking, of the battery lock by the operating element is precluded when the legitimate user of the vehicle has left the vehicle and has taken the onboard computer with him.

In accordance with a further embodiment, the vehicle has an electrically lockable frame lock that is electrically lockable by removing an onboard computer from the vehicle.

In this respect if the control unit only permits an unlocking of the battery lock when the frame lock is locked. Since the electric locking of the frame lock requires a supply with electric energy by the battery, it is ensured by this control sequence that the battery cannot be prematurely removed from the battery compartment and that the supply of the frame lock with electric energy cannot be interrupted before the frame lock is unlocked.

Alternatively or additionally, the control unit can block an unlocking of the battery lock as long as the vehicle is in motion. In this manner, an unintended unlocking of the battery lock during travel is prevented that could result in a falling of the battery out of the battery compartment under certain circumstances.

For example, the onboard computer can receive data from a motion sensor, positional sensor, speed sensor and/or pedaling frequency sensor of the vehicle, can determine whether the vehicle is in motion from these data, and can transmit a signal indicating the movement state of the vehicle to the control unit.

The battery lock may comprise a latch that locks the battery received in the battery compartment in a locked position and that can be brought by an electric drive into an unlocked position in which the latch releases the battery received in the battery compartment. To be able to lock the battery automatically and in particular currentlessly on an insertion of the battery into the battery compartment, the latch is preloaded into its locked position by a spring. An embodiment is, however, also conceivable in which the locking also takes place electrically in a corresponding manner to the unlocking.

If the battery lock is arranged at the frame side, for example if it is integrated into the battery compartment or attached separately therefrom to a frame of the vehicle, the latch can thus engage into a latch receiver of the battery received in the battery compartment in its locked position in accordance with a variant. The latch receiver of the battery can, for example, be formed in a battery housing surrounding the battery.

Conversely, it is also possible to arrange the battery lock at the battery side and in particular to integrate it into a battery housing surrounding the battery. In this case, with the battery inserted into the battery compartment, the latch would engage in its locked position into a latch receiver that is provided at the frame side and that is, for example, integrated into the battery compartment or is formed separately therefrom at the frame of the vehicle.

In accordance with an alternative embodiment, the latch blocks a lever by which the battery can be levered out of the battery compartment. In the case of a battery lock arranged at the frame side, the latch in its locked position therefore cooperates indirectly with the battery received in the battery compartment. It is generally also conceivable in this variant to arrange the battery lock at the battery side and in particular to integrate it into a battery housing surrounding the battery and, when the battery is inserted into the battery compartment, to block a lever by which the battery can be levered out of the battery compartment by a latch of the battery lock.

The electric drive for the latch can, for example, comprise an electric motor and an eccentric member that is connected between the electric motor and the latch.

Alternatively, the electric drive can comprise an electromagnetic actuator; for example, the latch can be formed from a magnetic material and can form an armature surrounded by a coil.

Finally, it must be pointed out that alternatively or additionally to the battery lock, a different electrically unlockable lock of the vehicle, by which, for example, a storage compartment, a container or a case of the vehicle can be locked or by which a different accessory part can be secured to the vehicle, can be formed and controlled in the above-described manner, and can in particular be electrically unlocked.

BRIEF DESCRIPTION OF THE DRAWING

The present disclosure will be described in the following purely by way of example with reference to the enclosed drawing and to an embodiment.

FIG. 1 shows a vehicle in accordance with the present disclosure.

DETAILED DESCRIPTION

The vehicle shown in FIG. 1 is an electric bike, for example an e-bike or a pedelec, that is equipped with an electric drive motor 10. In the present embodiment, the drive motor 10 is arranged in the region of a bottom bracket of the vehicle. It is, however, equally possible to attach the drive motor 10 to a front wheel hub or to a read wheel hub of the vehicle.

To control the drive motor 10, a control unit is provided that is implemented in an onboard computer 12 that is attached in the region of handlebars 14 of the vehicle and can be removed by a user of the vehicle on the leaving of the vehicle.

The vehicle furthermore has an electric frame lock 16 that is likewise controlled by the control unit. The control unit is specifically configured such that it automatically triggers a locking of the frame lock 16 when the onboard computer 12 is removed from the vehicle.

A battery 18 that is received in a battery compartment 20 that is formed at a seat tube 21 of a frame 22 of the vehicle is provided to supply both the drive motor 10 and the frame lock 16 with electric energy. It is alternatively possible to integrate the battery 18 and the battery compartment 20 into a luggage carrier 23 of the vehicle.

The battery 18 has a power connection, not shown, that enables a charging of the battery 18 directly at the vehicle. The battery 18 can furthermore be removed from the battery compartment 20 for maintenance purposes or replacement purposes or for a charging remote from the vehicle.

To prevent an unauthorized removal and an unintended falling of the battery 18 out of the battery compartment 20, a battery lock 24 is provided that secures the battery 18 in the battery compartment 20. In the present embodiment, the battery lock 24 is integrated into the battery compartment 20 and is configured such that it automatically adopts a locked state as soon as the battery 18 is inserted into the battery compartment 20, for example in that a latch 26 preloaded by a spring latches into a latching recess of the battery 18 or of a battery housing or blocks a lever pivoted on the insertion of the battery 18. The battery 18 received in the battery compartment 20 is in this manner normally secured by the locked battery lock 24.

The unlocking of the battery lock 24 takes place electrically. For this purpose, the battery lock comprises an electric drive 28 by which the latch 26 can be at least temporarily moved against the restoring force of the spring into an unlocked position releasing the battery 18. For example, the electric drive 28 can comprise an electric motor and an eccentric member that is connected between the electric motor and the latch 26. Alternatively, the electric drive 28 can comprise an electromagnetic actuator; for example, the latch 26 can be formed from a magnetic material and can form an armature surrounded by a coil.

The control unit implemented in the onboard computer 12 is provided to control the battery lock 24 and also controls the drive motor 10 and the frame lock 16. In the present embodiment, the unlocking of the battery lock 24 is triggered by a user input at the onboard computer 12, for example in that the user presses a corresponding button on the onboard computer 12. Alternatively, however, an embodiment is also conceivable in which a corresponding unlocking button is provided at the battery lock itself and the control unit only outputs a release signal to the battery lock 24 that is a requirement for an activation of the unlocking button. In both cases, the battery lock 24 can only be unlocked when the onboard computer 12 is attached to the vehicle such that an unauthorized unlocking and removal of the battery 18 with a removed onboard computer is impossible or at least made more difficult.

Since the frame lock 16 relies on the supply with energy by the battery unit 18 for its locking, the control unit is configured such that it triggers an unlocking of the frame lock 16 on a removal of the onboard computer before the battery lock 24 is unlocked. It is prevented in this manner that the frame lock 16 can no longer lock because the battery 18 has been removed from the battery compartment 20.

The control unit is furthermore configured such that it blocks a locking of the frame lock 16 as long as the vehicle is in motion. The control unit for this purpose receives data from at least one suitable sensor (not shown) provided at the vehicle, e.g. a motion sensor, positional sensor, speed sensor and/or pedaling frequency sensor, and determines the movement state from these data. The control unit also uses the same criterion for the battery lock 24 to prevent the battery lock 24 from accidentally being unlocked during travel.

REFERENCE NUMERAL LIST 10 drive motor
12 onboard computer
14 handlebars
16 frame lock
18 battery
20 battery compartment
21 seat tube
22 frame
23 luggage carrier
24 battery lock

The invention claimed is:

1. A vehicle comprising:
an electrically operated drive motor;
a battery for an energy supply of the drive motor that is secured in a battery compartment of the vehicle by an electrically unlockable battery lock and that can be removed from the battery compartment after unlocking the battery lock;
an onboard computer is configured to receive data from a sensor and to determine whether the vehicle is in motion from the received data; and
a control unit for the battery lock, the control unit blocks the unlocking of the battery lock when it is determined that the vehicle is in motion.

2. The vehicle in accordance with claim 1,
wherein the battery lock is configured to lock automatically after the insertion of the battery into the battery compartment.

3. The vehicle in accordance with claim 1,
wherein the control unit is integrated into a motor control for the drive motor.

4. The vehicle in accordance with claim 1,
wherein the control unit is implemented in the onboard computer that is attached to the vehicle in a manner removable by a user.

5. The vehicle in accordance with claim 4,
wherein the onboard computer has an input actuated by the user to unlock the battery lock.

6. The vehicle in accordance with claim 1,
wherein the control unit is integrated into the battery lock.

7. The vehicle in accordance with claim 1,
wherein the battery lock has an operating element that is actuated by a user for unlocking the battery lock.

8. The vehicle in accordance with claim 7,
wherein the control unit only permits an unlocking of the battery lock by the operating element as long as the onboard computer is attached to the vehicle.

9. The vehicle in accordance with claim 7, wherein the operating element is manually actuated by the user for unlocking the battery lock.

10. The vehicle in accordance with claim 1,
wherein the vehicle has an electrically lockable frame lock that is electrically lockable by removing the onboard computer from the vehicle.

11. The vehicle in accordance with claim 10,
wherein the control unit only permits the unlocking of the battery lock when the frame lock is locked.

12. The vehicle in accordance with claim 1,
wherein the sensor is at least one of a motion sensor, positional sensor, speed sensor and pedaling frequency sensor of the vehicle,
and
wherein the onboard computer is configured to transmit a signal indicating a movement state of the vehicle to the control unit.

13. The vehicle in accordance with claim 1,
wherein the battery lock comprises a latch that locks the battery received in the battery compartment in a locked position and that can be brought by an electric drive into an unlocked position in which the latch releases the battery received in the battery compartment.

14. The vehicle in accordance with claim 13,
wherein the electric drive comprises an electromagnetic actuator.

15. A vehicle comprising:
an electrically operated drive motor;
a battery for an energy supply of the drive motor that is secured in a battery compartment of the vehicle by an electrically unlockable battery lock and that can be removed from the battery compartment after unlocking the battery lock; and
a control unit for the battery lock, the control unit is implemented in an onboard computer that is attached to the vehicle in a manner removable by a user, the control unit only permits an unlocking of the battery lock when the onboard computer is attached to the vehicle.

16. The vehicle in accordance with claim 15,
wherein the battery lock is configured to lock automatically after the insertion of the battery into the battery compartment.

17. The vehicle in accordance with claim 15,
wherein the control unit is integrated into a motor control for the drive motor.

18. The vehicle in accordance with claim 15,
wherein the onboard computer has an input actuated by the user to unlock the battery lock.

19. The vehicle in accordance with claim 15,
wherein the battery lock has an operating element that is actuated by a user for unlocking the battery lock.

* * * * *